M. WEINRICH.
APPARATUS FOR REVIVIFYING AND FOR DECARBONIZING BONE BLACK AND OTHER FILTERING MEDIA.
APPLICATION FILED DEC. 13, 1915.
1,184,398. Patented May 23, 1916.
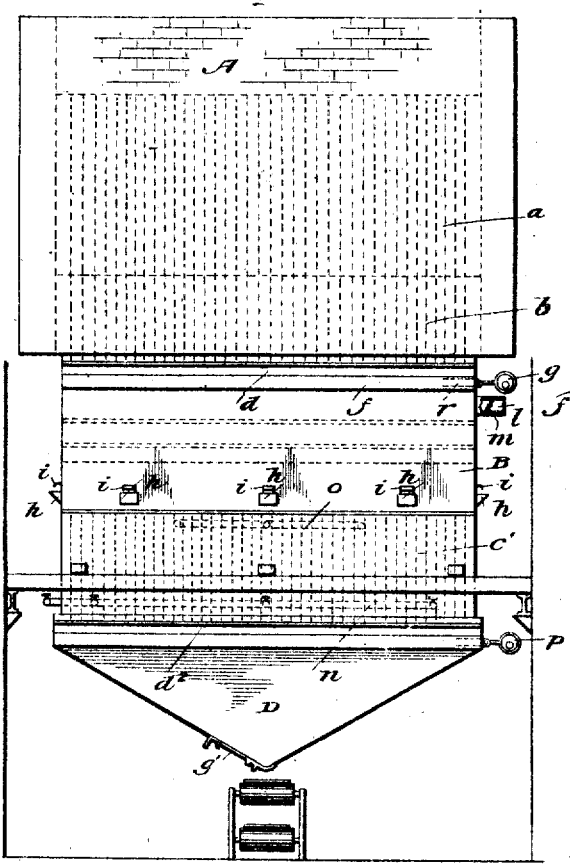
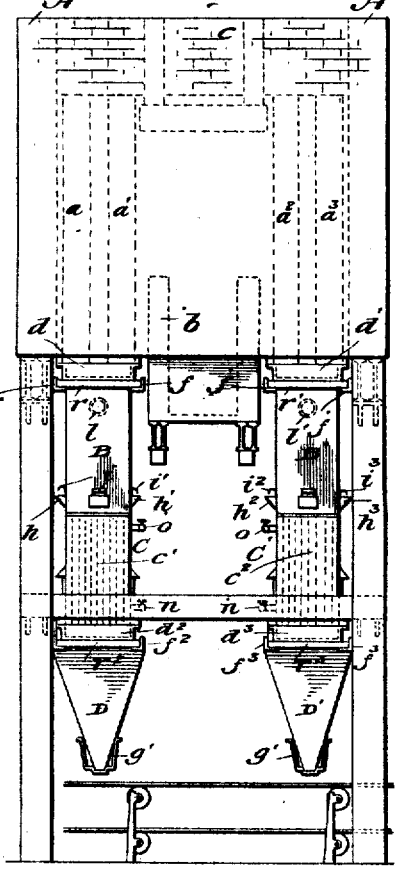
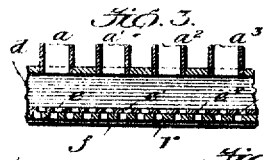
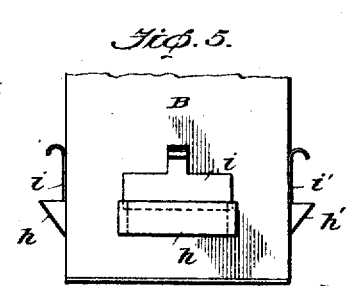
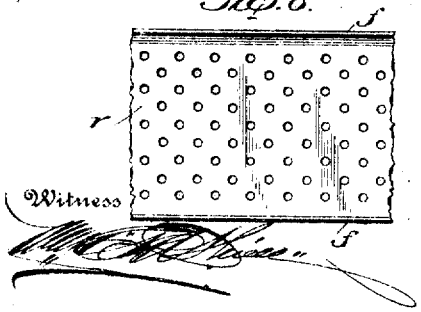
Inventor
Moriz Weinrich.
By T. Walter Fowler
Attorney
Witness

UNITED STATES PATENT OFFICE.

MORIZ WEINRICH, OF NEW YORK, N. Y.

APPARATUS FOR REVIVIFYING AND FOR DECARBONIZING BONE-BLACK AND OTHER FILTERING MEDIA.

1,184,398.   Specification of Letters Patent.   Patented May 23, 1916.

Application filed December 13, 1915. Serial No. 66,667.

*To all whom it may concern:*

Be it known that I, MORIZ WEINRICH, a citizen of the United States, residing at New York city, in the county of New York and State of New York, have invented certain new and useful Improvements in Apparatus for Revivifying and for Decarbonizing Bone-Black and other Filtering Media, of which the following is a specification.

My invention relates to an apparatus for revivifying and for decarbonizing bone-black and other filtering media, and it consists of the parts, and the constructions, arrangements and combinations of parts which I will hereinafter describe and claim.

A leading object of the invention is to provide a simple and effective apparatus for revivifying and for decarbonizing bone-black and other filtering media and, primarily, where such apparatus is used in combination with kiln retorts, as generally used for the revivification of bone-black, or in combination with other devices, apparatus or machines, in which bone-black or other filtering media can be heated to the temperature required for the successful operation of the apparatus, which I will hereinafter describe.

For present purposes, I have shown my improvements as associated with kiln retorts, but it will be understood that other forms of heating appliances may take the place of the retort where this can be done and satisfactory results obtained.

In the accompanying drawings forming part of this specification and in which similar reference characters indicate like parts in the several views; Figure 1 is a side elevation of an apparatus for revivifying and for decarbonizing bone-black and other filtering media embodying my invention. Fig. 2 is a vertical cross sectional view of the same. Figs. 3, 4, 5 and 6 are enlarged details which I will hereinafter describe.

In the aforesaid drawings the apparatus which I have invented is shown in connection with a retort kiln comprising two or more double rows of retorts inclosed by an appropriate brick work, A, A', and an appropriate cooling apparatus, C, C', for cooling and discharging the treated material, and the construction of which parts may be of my approved character.

In the illustrated embodiment of my invention, I have shown an apparatus which comprises double rows of kiln retorts, $a$, $a'$, $a^2$, $a^3$, &c., there being an aggregate of about 80 retorts in the apparatus shown and which retorts are inclosed by the brick work, A, A', and are retained above the cooling chambers, C, C', there being a furnace, $b$, of any well known and suitable character arranged substantially between the innermost of the double rows of retorts shown in Fig. 2, said furnace being for the purpose of heating the material contained in the retorts, to the desired degree, and the apparatus being provided with an appropriate flue, $c$, through which the waste gases escape to a drier, not shown, or otherwise.

Underlying the retorts are suitable inclosed chambers, $d$, $d'$, which I will hereinafter refer to as distributing chambers, each of said chambers having an air-tight connection with two rows of retorts, $a$, $a'$, $a^2$, $a^3$, &c., and said chambers extending substantially for the whole length of the kiln, and, in practice, each being from six to ten inches high, so that the bone-black or other filtering media, discharging from the retorts, will cover completely the bottom of the aforesaid chambers. The bottom of the chambers, $d$, $d'$, are perforated, either by forming slits therein, or by making them with circular openings, $e$, $e'$, $e^2$, $e^3$, &c., as shown in Figs. 3, 4 and 6, which latter construction I prefer in the construction of said chambers. The openings or perforations formed in the bottom of the chambers, $d$, $d'$, are designed to be just large enough to allow the free passage of the bone-black or other filtering media, and in constructing these chambers, and in order to secure the close joint which appears to be desirable, I prefer to plane or otherwise finish the lower side of each of the plates which form the bottom of the chamber. Closely fitting under the bottom of each of the aforesaid chambers, $d$, $d'$, is a planed or other finished perforated plate, $r$, whose perforations are approximately the same as those formed in the bottom plate of the chamber and which plates, $r$, $r'$, are supported at their edges by appropriate horizontal guides, $f$, $f'$, as shown in Figs. 4 and 6, and between which guides the plates, $r$, $r'$, may have a reciprocable, or a to-and-fro movement imparted to them by any suitable means, for instance, by an eccentric, g, and suitable connection as shown in Fig. 1.

The arrangement of the aforesaid plates and the essential object of their employment in this apparatus is to enable me to provide a discharge in a regulated way for the filtering material, which material sifts through the perforations in the bottom of the distributing chambers, d, d', and through plates, r, r', in the form of a shower of thin streams. The perforations in the aforesaid plates, r, r', are designed to register with the perforations in the bottom of the chambers so that by a movement of the plates, r, r', in one direction, about one-half of the perforations will be in register with corresponding perforations in the bottom of the chambers and in the movement of the plates, r, r', in an opposite direction, the other half of their perforations will be in register with the perforations in the bottom of the chambers, whereby the filtering material will fall practically continuously through the perforations during the operation of the apparatus.

Between each of the distributing chambers, d, d', and the cooling portion, C, C', of the apparatus, I interpose the closed chambers, B, B', which may be constructed of suitable metal and may be from four to six feet high, more or less, and have a width and length about equal to the distributing chambers, b, b', and from which distributing chambers the bone-black, or other filtering material, is delivered to the cooling chambers in the form of many thin streams. The closed chambers, B, B', are what I will hereinafter refer to as the oxidizing or de-carbonizing chambers and in the construction shown, I have provided these chambers at one end and, if desired, at the sides, with one or more air vents, h, h', h², h³, &c., as shown in Figs. 1, 2 and 5, which vents are situated, in practice, about one foot above the bottom of each of said chambers, each of the vents being about one foot wide and about six inches high, and each vent being provided with a sliding shutter, i, i', i², i³, etc., for preventing the filtering material from flowing out in case it should accumulate too high on top of the pipes, c, c', with which the cooling chambers are provided, and which pipes are surrounded by a cooling medium.

In addition to the aforesaid vents, I provide each of the oxidizing chambers at a point near the top of the same, with an air vent, l, l', Figs. 1 and 2, and which vent is in turn connected with a flue which, in practice, may be connected either with a flue leading into a drier, or to a fan or other device, not shown, said flue being provided with a regulating damper, m.

The cooling chambers, C, C', consist of a casing or shell in which the pipes, c, c', of which there may be a large number, are arranged in upright position, with their upper ends communicating with the oxidizing chambers above, so that the filtering medium on leaving the oxidizing chambers passes through the water cooled pipes and has its temperature reduced to the desired extent. The cooling of the filtering material may be done either by water, admitted through a suitable inlet, n, as shown in the drawing, in which case the whole cooler has to be inclosed, the cooling water entering continuously at the bottom through an inlet pipe, n, the water thus entering the shell of the cooling apparatus and surrounding the pipe and flowing out through the pipe, o, at the top. If desired, the pipes may be cooled by air, either with or without forced draft in a manner well known in this art.

At the bottom of the cooling chambers are arranged other chambers, d², d³, which are similar in construction and arrangement to the chambers, d, d', which underlie the retorts, a, a', a², a³, etc., and the lower ends of the cooling pipes communicate with and deliver the filtering material into said chambers, d², d³, the bottom of these chambers having perforations similar to those formed in the bottom of the upper chambers, b, b', and the chambers, d², d³, having a close fit against perforated and planed plates, r², r³, which are slidably mounted in guides, f², f³, and each of said plates being designed to be moved to and fro by an eccentric, p, in substantially the same manner as described for the plates, r, r', whereby the discharge of the cooled filtering material will be the same as that being discharged from the distributing chambers, d, d', above, said cooled material being in turn delivered directly into suitable hoppers, D, D', which underlie the cooling chambers and which preferably have downwardly converging walls and each hopper having an outlet controlled by a suitable gate or valve, g, for regulating the discharge of the revivified bone-black or other cooled filtering material, which may finally be delivered from the hoppers, D, D', onto an endless traveling belt, or other conveyer, E, said material being now in condition for re-use.

From the foregoing it will be readily understood that the operation of the apparatus described is substantially as follows: The bone-black or other filtering material is heated in the retorts, a, a', a², a³, etc., or in any other suitable vessels having air-tight connection with the distributing chambers, d, d', so that the retorts, as well as the chambers, are always filled with material. When treating bone-black its temperature should be brought to about 900° F., for simply revivifying, and to about 1100° F. if simultaneously one-half to one per cent. of carbon is to be removed. The temperature is regulated by the fire in the furnace, $b$, and this can be ascertained by a pyrometer inserted into the wall of the oxidizing chamber, B, or by other suitable temperature-indicating means, not shown. The material heated to the desired temperature, is by the back and forth movement of the perforated plates, $r$, $r'$, caused to fall practically continuously in the form of many thin streams and in this condition the material passes through the oxidizing chambers, $b$, $b'$, in each of which is maintained a regulated draft of atmospheric air through the air vents, $h$, $h'$, $h^2$, $h^3$, etc., and the flue, $m$. While falling through this draft of air in a shower, every particle of the hot material will be hit by the air, causing thereby the desired oxidization of the heated impurities retained by the bone-black or other material under treatment, and, also, of a certain amount of any excess of carbon. The bone-black shall be allowed, before the discharge from the coolers, C, C', into the hoppers, D, D', begins, to accumulate about six inches on top of the cooling pipes. As all of the pores of the hot particles of bone-black have been filled with air, while falling through the draft of air, the oxidization of the impurities will be finished while the hot bone-black is lying on top of the cooling pipes. In this way, all of the impurities will be oxidized and carried off in gaseous form by the draft of air leaving thereby the pores of the bone-black always free, avoiding any accumulation of carbon, which will occur with ordinary kiln work, choking greatly the pores and reducing greatly the efficiency of the bone-black.

Since the temperature of the bone-black has to be brought only to about 900° F. for revivifying, while with ordinary kiln work, it has to be brought to about 1200° F., and maintained at this temperature for at least half an hour, it is obvious that by the use of my apparatus, not only the pores of the filtering material will be kept always clean and highly efficient, but also the capacity of the kilns will be greatly increased, much fuel saved, and the life of the retorts prolonged, owing to the mildness of heat applied.

Having thus described my invention what I claim as new and desire to secure by Letters Patent is:—

1. In apparatus for revivifying granular filtering materials, the combination with means for heating a mass of granular material, a substantially air-tight chamber into which said material is fed in its heated condition, and means for discharging the heated material from said chamber in thin streams 2. In apparatus for revivifying granular filtering materials, the combination with means for heating a filtering agent of a substantially air-tight chamber into, which the heated filtering agent is delivered, said chamber having a foraminous bottom for discharging the filtering agent from said chamber in shower-like form.

3. In apparatus for revivifying granular filtering materials, the combination with means for heating a mass of granular material, a substantially air-tight chamber into which said material is fed in its heated condition, means for discharging the heated material from said chamber in showering streams, and means for subjecting the streams of heated discharging material to the action of an air current and thereby oxidizing the contained impurities of said material.

4. In apparatus for revivifying granular filtering materials, the combination with means for heating a mass of granular material, a substantially air-tight chamber into which said material is fed in its heated condition, means for discharging the heated material from said chamber in thin streams, and means for admitting an air current to the falling streams of heated material for the purpose of oxidizing impurities contained therein.

5. In apparatus for revivifying granular filtering materials, the combination with means for heating a mass of granular material, a substantially air-tight chamber into which said material is fed in its heated condition, means for discharging the heated material from said chamber in thin streams, means for admitting an air current to the falling streams of heated material for the purpose of oxidizing impurities contained therein, and means for positively lowering the temperature of said material.

6. In apparatus for revivifying granular filtering materials, the combination with means for heating a mass of granular material, a substantially air-tight chamber into which said material is fed in its heated condition, means for discharging the heated material from said chamber in thin streams, means for admitting an air current to the falling streams of heated material for the purpose of oxidizing impurities contained therein, and a cooling chamber into which the heated material is discharged.

7. In apparatus for revivifying granular filtering materials, the combination with means for heating a mass of granular material, a substantially air-tight chamber into which said material is fed in its heated condition, means for discharging the heated material from said chamber in thin streams, means for admitting an air current to the falling streams of heated material for the purpose of oxidizing impurities contained therein, and a heat exchanger into which the heated material is discharged.

8. In apparatus for revivifying granular filtering materials, the combination with means for heating a mass of granular material, a substantially air-tight chamber into which said material is fed in its heated condition, means for discharging the heated material from said chamber in thin streams, means for admitting an air current to the falling streams of heated material for the purpose of oxidizing impurities contained therein, a cooler including pipes forming conductors for said material, and means for supplying a cooling fluid about said pipes.

9. In apparatus for revivifying granular filtering materials, the combination with a retort kiln or vessel for heating bone-black or other filtering media, of a chamber having air-tight connection with said retort or vessel, the bottom of said chamber being perforated, a perforated slide arranged closely beneath the bottom of said chamber, and means for reciprocating said perforated slide relatively to the perforated bottom to permit the discharge of bone-black or filtering material in many thin streams through said perforations.

10. In apparatus for revivifying granular filtering materials, the combination with a retort kiln for heating bone-black or other filtering media, a chamber beneath and communicating with the lower end of the retort and having an air-tight connection therewith, said chamber having a perforated bottom, a perforated plate arranged closely under the bottom of said chamber and horizontal guides for the plate, and means for reciprocating the plate whereby the perforations thereof are brought more or less into and out of register with the perforations in the bottom of said chamber and permitting the discharge of the bone-black or other filtering media in many thin streams.

11. In apparatus for revivifying granular filtering materials, the combination with a retort kiln or vessel for heating bone-black or other filtering media, of a chamber having air-tight connection with said retort or vessel, the bottom of said chamber being perforated, a perforated slide arranged closely beneath the bottom of said chamber, means for reciprocating said perforated slide relatively to the perforated bottom to permit the discharge of the bone-black or other filtering material in many thin streams through said perforations, a closed chamber into which the heated filtering material is permitted to fall, said chamber having air vents for maintaining a draft of air through the chamber in contact with the falling material and thereby causing the oxidization of impurities taken up by the filtering material and also any excess of carbon, accumulated in said filtering material, and a cooling chamber connecting with said second-named chamber and into which the oxidized material is delivered.

In testimony whereof I affix my signature.

MORIZ WEINRICH.

It is hereby certified that in Letters Patent No. 1,184,398, granted May 23, 1916, upon the application of Moriz Weinrich, of New York, N. Y., for an improvement in "Apparatus for Revivifying and for Decarbonizing Bone-Black and other Filtering Media," an error appears in the printed specification requiring correction as follows: Page 1, line 53, for the word "my" read *any;* and that the said Letters Patent should be read with this correction therein that the same may conform to the record of the case in the Patent Office.

Signed and sealed this 20th day of June, A. D., 1916.

[SEAL.]

J. T. NEWTON,
*Acting Commissioner of Patents.*

Cl. 127—2.